Nov. 11, 1941.  J. C. LANG  2,262,013
FUEL SUPPLY AND CARBURETING SYSTEM FOR INTERNAL COMBUSTION ENGINES.
Filed July 19, 1939  2 Sheets-Sheet 2
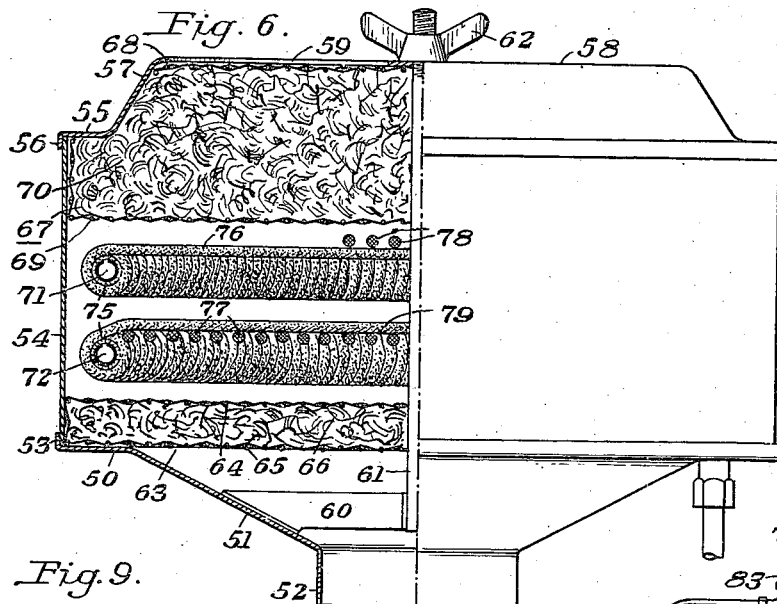
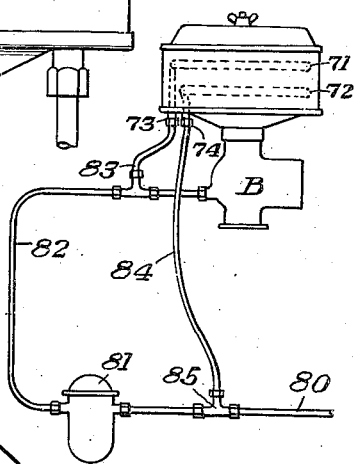
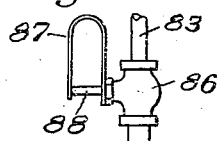
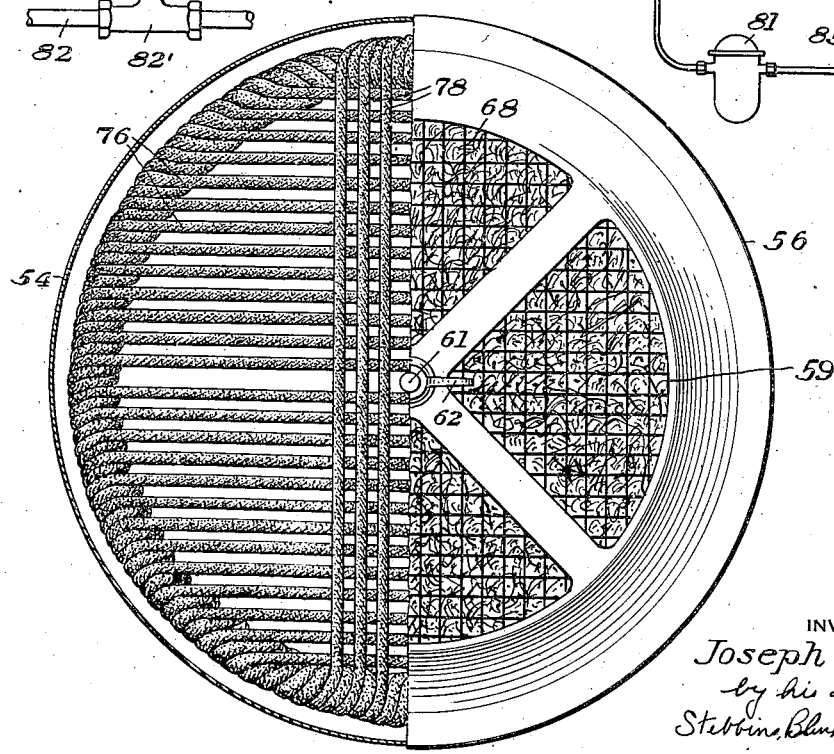
INVENTOR
Joseph C. Lang
by his attys.
Stebbins, Blenko & Parmelee Patented Nov. 11, 1941

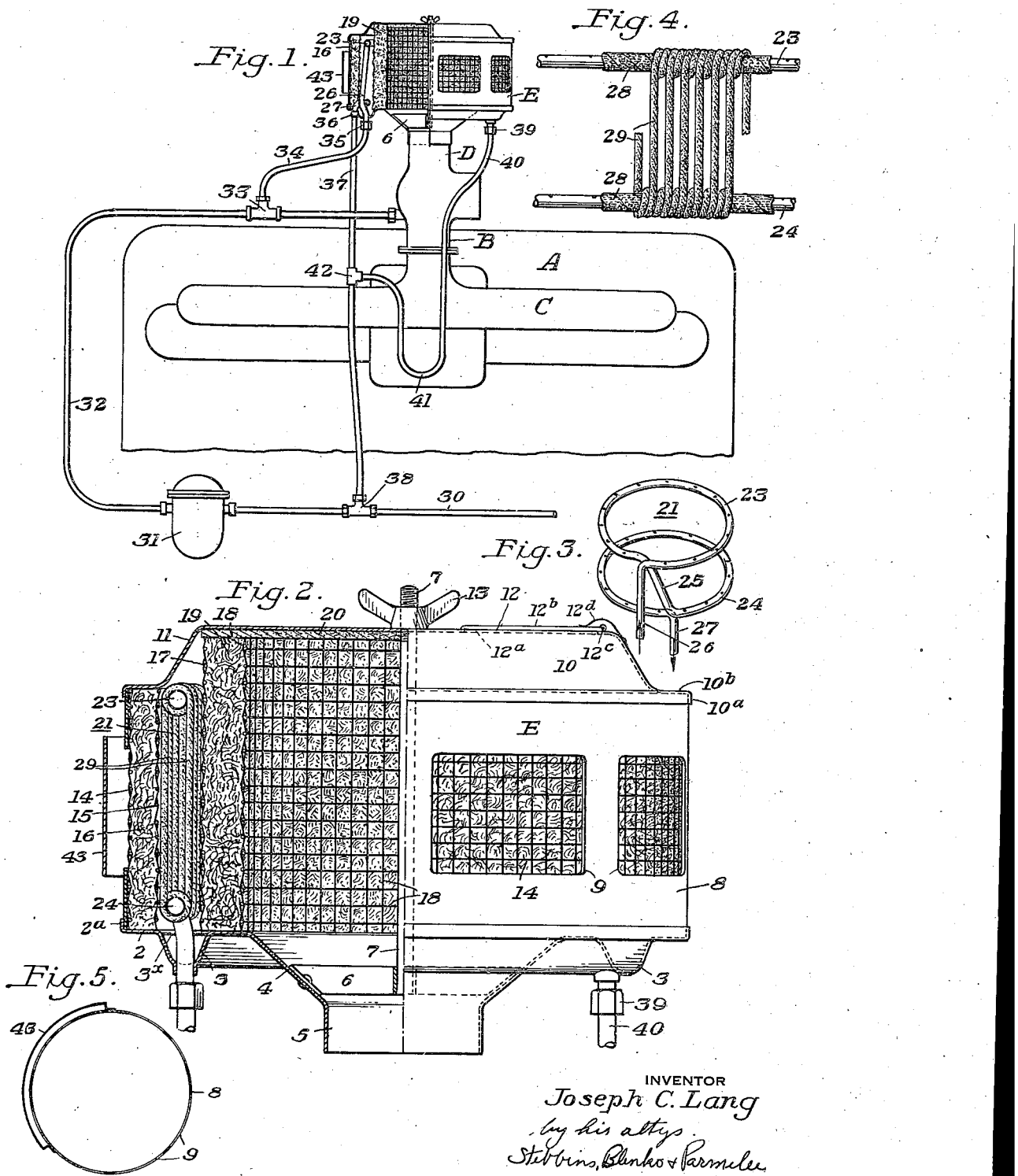

2,262,013

UNITED STATES PATENT OFFICE 2,262,013

FUEL SUPPLY AND CARBURETING SYSTEM FOR INTERNAL COMBUSTION ENGINES

Joseph C. Lang, Pittsburgh, Pa., assignor to Bocji Corporation, Pittsburgh, Pa., a corporation of Delaware Application July 19, 1939, Serial No. 285,298

17 Claims. (Cl. 261—105)

This invention relates to the fuel supply and carbureting system of an internal combustion engine and is especially for an auxiliary carbureting device and fuel supply system therefor of the type wherein the combustion air is caused to evaporate fuel and thus form a lean mixture in advance of the air flowing into the main carburetor of the engine.

In the co-pending application of Emery E. Phillips, Serial No. 211,090, filed May 31, 1938, there is disclosed an internal combustion engine having such an auxiliary carbureting unit in advance of the main carbureting unit and forming a lean mixture of the combustion air and fuel before the combustion air goes into the main carbureting device. This auxiliary carbureting unit which is frequently referred to as a "booster" is of a character wherein the fuel is supplied to a plurality of capillary wicks. The air flowing between and past the wicks is charged with fuel vapor. The booster or auxiliary carbureting device as disclosed in the Phillips application comprises an enclosing structure having a reservoir formed in the bottom thereof. A frame supporting the capillary wick arrangement is provided within the enclosing structure, the wicks on the frame terminating in the fuel reservoir so as to absorb the liquid therefrom. The enclosure also contains a mass of steel wool or like air filtering substance for cleaning the air which is inducted into the engine and a further body of such material forming a back-fire screen so that the booster not only is a preliminary carbureting device but is also an air cleaner and filter. It is desirable in a booster of this character to have a relatively large area of wick for the air to flow over and through and, with the Phillips arrangement, a relatively large reservoir for the wicks to dip into is required. While the arrangement works entirely satisfactorily, it is difficult to maintain a constant level of fuel in the reservoir. Because of its relatively large diameter, there is a considerable variation in depth of fluid in such a reservoir when the car is going up or down hill, causing the operation of a float valve to be somewhat unsatisfactory, and there is likely to be considerable evaporation loss from such a receptacle when the car is standing idle for a period of time.

The invention provides an auxiliary carbureting device or booster of the general type disclosed in said Phillips application but wherein the liquid fuel is continuously circulated through the device in a manner such as to keep the wicks at the desired degree of saturation, the excess being returned to the fuel supply pump of the engine in connection with which the device is used. The continuous circulation of fluid in this manner not only eliminates any requirement for a float and float chamber, but it enables the pump to continuously circulate fluid whether the carburetor itself is requiring any fluid or not, thus eliminating "vapor locks" in the fuel system.

My invention further provides a booster construction of improved mechanical design wherein any open reservoir for supplying fuel to the wicks is eliminated and which is better designed to function both as an air cleaner and a booster.

My invention may be readily understood by reference to the accompanying drawings in which:

Figure 1 is a more or less schematic view in which a portion of an internal combustion engine with its carburetor and fuel pump are schematically illustrated, the booster or auxiliary carbureting device being shown partly in section and partly in elevation on the air intake of the carburetor, the fluid circulating system also being shown in this figure;

Figure 2 is a view on a larger scale showing the booster unit partly in section and partly in side elevation;

Figure 3 is a detailed perspective view showing the perforated fluid-circulating coil which supports the capillary wick and which serves to supply liquid fuel to the wick;

Figure 4 is a detailed view showing the manner in which the capillary wick arrangement is built up on the tube structure shown in Figure 3;

Figure 5 represents a transverse horizontal section through the cylindrical shell constituting a portion of the enclosure of the unit;

Figure 6 is a view similar to Figure 2 showing a slight modification thereof;

Figure 7 is a top view partly in section and partly in elevation of the unit shown in Figure 6;

Figure 8 is a diagrammatic view showing the fluid circulating system for the arrangement illustrated in Figures 6 and 7; and Figure 9 is a detailed view illustrating schematically a further modification of the arrangement shown in Figure 8 wherein a thermostatically operated metering valve is employed.

Referring to the drawings, A designates an internal combustion engine having a down-draft carburetor B which delivers the carbureted charge of fuel and air to the engine through a manifold C, this arrangement being a conventional arrangement now commonly used in motor cars. The carburetor B is supplied with an upwardly extending air duct D. At the top of this air duct is mounted the auxiliary carbureting device or booster unit designated generally as E.

The unit E comprises a bottom pan 2 preferably formed of sheet metal having an annular trough-like portion 3 therein. The pan 2 is provided with a centrally positioned cone portion 4 terminating in a cylindrical flange 5, the flange 5 being for attaching the device to the air duct D at the top of the carburetor. Within the cone 4 there is illustrated a spider 6 which supports a central pin or bolt 7 that extends upwardly through the top of the device as shown. Around the rim of the bottom pan 2 is an annular flange 2a.

Setting on the bottom pan 2 and fitted within the flange 2a is a cylindrical shell 8 having a number of windows or openings 9 formed therein, this series of windows extending entirely around the device and providing a large total of open area through which air can flow to the interior of the shell. Fitted over the top of the shell 8 is a cover member 10 having a flange 10a that fits about the top of the shell and having a shoulder portion 10b against which the top of the cylindrical shell abuts. It is provided with an upwardly offset portion 11 and a flat top 12. The bolt 7 passes through the top 12, and a wing nut 13 threaded onto this bolt serves to tightly hold the bottom pan, the shell 8, and the cover member 10 in assembled relation. The structure may be readily dis-assembled upon removal of the wing nut 13.

Within the cylindrical shell or enclosure 8 is an air filter comprising eccentric outer and inner cylindrical screens 14 and 15 with a mass of loose filtering material 16 therebetween. This material is preferably copper scouring wool, but may be any other suitable non-combustible fibrous or porous filtering mass. The bottom edges of the screens 14 and 15 rest on the bottom pan 2 outside the trough 3, and the shoulder 10b on the cover 10 engages the top edges of these screens. In this way the air filtering structure is maintained in position inside the cylindrical shell 8 and the pan and cover of course prevent the filtering material 16 from becoming displaced.

Spaced inwardly from the outer air filter is a second air filter and back-fire shield or screen comprising outer and inner spaced wire screens 17 and 18 between which is a mass of copper wool or other fire resistant fibrous material, preferably metallic, 19. This inner air filter and back-fire screen is supported at its bottom on the bottom pan 2 on the portion thereof inside the trough 3 and outside the conical portion 4. The top of this inner filter and back-fire screen abuts against the top 12 of the cover member 10, and the screen is tightly confined against endwise movement between these two members. While the offset portion 11 prevents the inner screen from shifting radially and maintains it concentric with the outer air filter, it is important that the bottom of this back-fire screen be in tight contact with the pan 2 and that the top of this inner air filter or fire screen be tight against the lining on the top portion 12 of the cover 10 so that in the case of a back-fire in the carburetor sending a flame up through the downdraft duct into the space inside the inner air filter, this flame cannot communicate or pass through any space either below or above the inner air filter or back-fire screen, and as an additional guard against this, the top 12 of the cover 10 is preferably provided with an asbestos cover 20 on the inner surface thereof. The asbestos covering 20 not only is an added guard against back-firing around the top of the inner air filter member, but has a dampening effect on sounds so as to make the structure operate more silently than where such material is not provided.

In the space between the inner and outer filter units is the vaporizing unit designated generally as 21. In its preferred form it comprises an upper coil of pipe or tubing 23 and a lower coil of pipe or tubing 24. These two coils are preferably formed from a single length of tubing as shown in Figure 3. The pipe is coiled to form an upper loop or convolution. It is then bent downwardly at 25 and then bent around to form a lower loop 24. One end of the coil 26 is turned vertically downwardly and the other end 27 is also bent vertically downwardly. The two downwardly extending legs of the coil unit pass through the trough and pan 3 and the joint is soldered where these terminals of the coil pass through the pan. The coil is provided with numerous small holes at intervals therealong. Wrapped tightly about the coils 23 and 24 is a layer of fabric or wick-forming material as best shown in Figure 4. The fabric is formed of capillary fibres forming a continuous wick about the two coils. Extending vertically between the two coils are vertical wick elements 29. The elements 29 are preferably formed by wrapping a continuous strand of corded wick material around one coil and then around the other in the manner shown in Figure 4 to provide more or less regularly spaced strands. This is accomplished, for example, by wrapping the wick material once around the lower pipe and then extending it upwardly and wrapping it once around the upper pipe and thence back to the lower pipe, etc., this forming two series of vertically extending strands 29, one series being spaced inwardly from the other and one series being staggered with respect to the other. By forming the coils 23 and 24 in such manner that they tend to spring apart to a slight extent, this resilience may be relied upon to keep the strands 29 taut.

In operation, liquid fuel is forced into the terminal 26 and flows first through the upper convolution of pipe and then through the lower one and discharges through the terminal 27. Some of the liquid escapes through the perforations along the length of the tubing, wetting the fabric layer 28. This in turn wets the capillary strands 29 causing the wicks to be kept continuously wet with fuel.

The flow of air induced by the operation of the engine is drawn through the windows 9 through the outer filter where the air is broken up into very fine streams. The air then flows around and between the wicks or strands 29 and then flows through the inner filter and back-fire screen to the interior chamber of the device from whence it is drawn down into the carburetor.

In order to maintain the circulation of liquid fuel through the coils as long as the engine is running, the coils are connected directly into the fuel pump system for the engine. In Figure 1 the fuel supply line to the engine is designated 30, and 31 is the usual fuel pump. These pumps have a diaphragm which operates continuously when the engine is running. As ordinarily used, there is a flow of liquid, however, only when the carburetor float valve opens to permit the flow of fuel into the carburetor bowl, the pressure developed by the pump being of a very small order.

There is a pipe 32 leading from the pump to the carburetor float chamber. According to the present invention a coupling 33 is placed in the line 32 from which leads a branch pipe 34 that connects through a union at 35 to the coil terminal 26. The other coil terminal 27 is provided with a union 36 to which is coupled a pipe 37, this pipe being coupled at its opposite end to a T 38 in the fluid supply line 30 leading to the pump. It will thus be seen that as long as the engine is operating, the pump 31 may continuously circulate fuel through this continuous loop or circulating system.

While much of the gasoline or fuel being thus circulated will stay in the circulating system, some of it will, of course, be discharged into the wick structure. It may be discharged into the wick structure at a rate greater than the rate at which it is consumed, as it is desirable to keep the wick structure quite wet. With the present invention when the wicks become saturated, the excess fuel can drip from the wick structure into the annular trough 3 in the bottom pan 2. To exclude foreign particles that may fall down from the wick, a very fine mesh screen 3x is provided over the top of the drip trough 3. Connected to the annular trough 3 through a union 38 is a drain pipe 40 which is looped at 41 to form a trap, the discharge end of the pipe being connected at 42 to the return line 37. Excess liquid supplied to the wick structure may thus be returned to the fuel circulating system, the trap 41 of course forming a seal to prevent the free induction of air into the system.

The arrangement described provides a relatively large area of wick for contact with the incoming air. The air stream is broken up into small currents by the first air filter. Practically all of the air is brought into intimate contact with some portion of the wick surface from which it evaporates fuel. The air, after picking up the fuel vapor, passes through the inner filter and back-fire screen which also diffuses the flow of air in such manner that the air is drawn into the structure substantially uniformly around the entire structure. The arrangement not only provides an efficient preliminary carbureting unit, but is an effective air cleaner as well. After the device has been used for a period of time, the cover can be removed and the two filtering elements can be lifted out and replaced, or washed in gasoline, thus providing a filter which can be kept clean. The continuous fuel circulating system enables the wicks to be kept abundantly wet, but no loss of fuel is occasioned even when an excess of fuel is supplied to the wicks. By providing what may be termed a shunt or looped fuel circulating system around the pump 31 and into which loop the carburetor is connected, the trouble heretofore encountered from vapor locks is eliminated. By providing a large area of wick surface and a large area of openings 9 for the inlet of air, the air does not move at too high a velocity over the wicks at any given point and the device operates to reduce the hissing or wind noise produced by the suction of the engine.

To prevent any back-fire from building up a pressure in the unit, some portion of the device, as for example the portion 12 of the top, may be provided with one or more ports with resiliently closed doors. Such a port is indicated at 12a in Figure 2, and 12b designates a door hinged at 12c and held shut by a light leaf spring 12d. This door is normally closed, but if a back-fire occurs in the carburetor, the back pressure will force the door 12b open and the pressure will be instantly relieved and the spring will return the door to its closed position.

In order to get a better distribution of the air into the device, a baffle 43 may be secured to the front of the shell 8 so that the current of air thrown back by the engine fan or produced by the movement of the car cannot blow directly into the windows at the front of the casing or shell thus tending to equalize the intake of air through each of the several windows.

In the modification shown in Figures 6, 7 and 8, the construction of the unit is considerably modified from that shown in Figures 1 and 2, but the same general arrangement of continuously circulating fluid through a perforated tube support is provided. Referring first to Figures 6 and 7, the unit comprises a bottom pan 50 having a conical portion 51 with a central cylindrical flange 52 extending from the bottom thereof for adapting the unit to the air intake duct of the carburetor. The pan has an annular peripheral flange 53 extending upwardly therefrom. Set onto the pan and fitted within the flange 53 is a cylindrical shell or body member 54. At the top of this cylindrical shell is a cover member 55 having a depending annular flange 56 that fits around the shell 54 and having an upwardly offset portion 56 and a flat top portion 58, the top portion 58 being in the form of an open web or spider providing a plurality of sector-shaped windows 59. Secured in the conical portion 51 of the bottom member is a spider 60 that supports a central bolt 61 that passes upwardly through the structure and through an opening at the center of the cover member. A wing nut 62 releasably holds the parts in assembled relation.

Supported on the bottom pan 50 is an air diffusing filtering and back-fire screen designated generally as 63 and comprised of upper and lower disks formed of wire mesh, these disks being designated 64 and 65 respectively. Between these disks of wire mesh is a mass of copper scouring wool or like material 66. The back-fire screen 63 extends horizontally across the full diameter of the interior of the structure. In the top portion of the device there is a generally similar air filter 67 comprised of upper and lower screens 68 and 69 respectively which is a mass of metal wool or other suitable filtering material 70. This air filter 67 is attached to the cover for removal therewith by means of the edges of the wire screen 69 being soldered to the under side of the cover.

In the space between the two filters is the fuel vaporizing unit. Like the wick structure disclosed in Figure 3, the device is preferably formed of a single piece of tubing bent to form two loops, an upper loop 71 and a lower loop 72, the general construction of the unit being much the same as that shown in Figure 3 but with the two loops relatively closer together. The coil is provided with an inlet terminal 73 and a discharge terminal 74 (see Figure 8) and both the upper and lower convolutions are perforated with small holes at intervals along the length, the perforations, as shown in Figure 3, being in the top of the convolutions. Wrapped tightly around each coil is a layer of wick-forming substance or fabric 75. A layer of spaced parallel strands or cords of wick-forming material is stretched across each coil, this layer of strands on the upper coil being designated 76 and the corresponding strands on the lower coil being designated 77, the strands on the lower coil extending at right angles to those on the upper coil. In addition there may be a few strands 78 over top of the strands 76 to more effectively hold them in position, and there may be a few similar strands 79 over the layer of strands 77. The layer of strands 76 and 77 are preferably formed by wrapping a continuous cord or rope of wick-forming material first around the coil, then across the coil to an opposite point, again around the coil and back, thus providing for the spacing of adjacent strands.

In operation, gasoline or other suitable motor fuel is circulated through the coil unit. Some of the fuel passes through the perforations in the coil and thus serves to wet the wicks. The liquid is carried by capillary action across the entire length of the strands so that when the device is operated, the strands throughout their entire area are wet with gasoline. The air which is drawn in by the suction of the engine passes through the opening 59 in the cover through the upper filter, and in passing through the upper filter is broken up into finely divided streams and thoroughly diffused over the area of the unit. It then flows down between the upper layer of strands and then between the lower layer of strands evaporating gasoline therefrom and by reason of the fact that one layer of strands is at right angles to the other, the air is brought into more intimate contact with the wicks. After having evaporated the gasoline, the mixture passes through the back-fire screen 63 and is taken into the carburetor for final carburetion. In addition to providing protection against back-firing and providing an additional filter, the filtering screen 63 also serves to distribute the air flow across substantially the entire area of the unit and prevent straight line flow of air through the unit.

In Figure 8 the carburetor B is connected with a fuel supply pipe 80 through a pump 81 previously described and pipe 82. Leading from the pipe 82 is a branch pipe 83 through which fuel is conducted into the inlet terminal 73 of the evaporator. A pipe 84 leads from the discharge terminal 74 to a T 85 in the supply pipe 75, the arrangement thus providing a continuous fluid circulating system around the fuel pump as described in connection with Figure 1. In this modification no drip-collector is shown for collecting excess fuel that drops from the wicks. In the operation of this form of evaporator, a metering disk, not shown, is placed somewhere in the pipe 83, usually at the T coupling, so that there can be only a restricted flow of gasoline into the evaporator. This metering device which may be nothing more than an orifice plate having a tiny orifice therein allows sufficient liquid to circulate through the unit to keep the wick structure wet and maintain a continuous flow of fuel through the loop, but not fast enough to permit excess to drip, at least not in any appreciable amount, from the wicks.

While both forms of the device operate satisfactorily, the arrangement shown in Figures 1 and 2 is at present deemed by me to be preferable both from a manufacturing standpoint and from the fact that all of the wick strands are of the same length and are consequently moistened to the same extent by the fuel and also because a means can be provided for conveniently draining off the excess of gasoline which drips from the wicks and thus eliminate any need for a metering device to restrict the flow of liquid through the vaporizing unit. It will be apparent, however, that this drip-collecting feature shown in Figures 1 and 2 could be adapted to the arrangement shown in Figures 6 and 7 or that the use of a metering device in lieu of drip-collecting means could be used in the embodiment shown in Figures 1 and 2, or that in addition to the drip collector, a metering device may be used.

It is pointed out in the said Phillips application on which this invention is an improvement that by passing the air over the fuel-moistened wicks, a lean mixture is produced which in itself is incapable of satisfactorily operating the engine. When this lean mix, however, is passed through the subsequent carbureting step using the ordinary jet type carburetor, much better engine performance and improved mileage per gallon of fuel is secured due to the mixing of the air and dry vapor with the wet gas. The present invention enables the invention of the Phillips application to be used in a very much more flexible and efficient way. Where an arrangement as shown in Figure 1 particularly is used, it is quite flexible because since no metering disk is needed, each unit does not have to be especially fitted to the requirements of the car or engine on which it is to be used. Not only does the present invention constitute an improvement over the arrangement shown in said Phillips application from manufacturing installation and performance angles, but in addition, the invention eliminates the difficulties which are frequently encountered with vapor locks.

The fuel circulating system as herein described is disclosed and claimed in a divisional application filed by me June 27, 1940, Serial No. 342,742.

In the modification shown in Figure 9, the system of piping is the same as that shown in Figure 8 and similar reference numerals have been used to designate the corresponding parts, 82 being the line leading from the fuel pump to a T connector 82'. From one branch of a T a pipe leads to the carburetor, not shown. Attached to another branch of this connector is a metering valve 86 for controlling the flow of fluid to the vaporizer. The metering valve is shown as having a bi-metallic or other heat responsive element 87 secured thereto one end of which is fixed to the valve body and the other end of which is attached to the valve stem 88. The arrangement is such that as the temperatures under the engine hood increase so that the air passing through the vaporizer will evaporate more fuel, the valve will be opened allowing more fluid to flow to the vaporizer.

While I have illustrated and described certain preferred embodiments of my invention, it will be understood that this is by way of illustration and that various changes and modifications may be made therein within the scope of the appended claims.

I claim:

1. A vaporizer for supplying a mixture of air and fuel vapor comprising a capillary wick structure, means for circulating fuel through the wick structure to supply fuel thereto, the wick structure being tightly formed about said means to prevent the free escape of fuel from said means except by capillary action, and means surrounding the wick structure for directing the flow of air through the wick structure in a direction normal to the surface of the wick.

2. A vaporizer for supplying a mixture of air and fuel vapor comprising a wick structure, means for circulating fuel through the capillary wick structure to supply fuel thereto, the wick structure being tightly formed about said means to prevent the free escape of fuel from said means except by capillary action, means surrounding the wick structure for directing the flow of air through the wick structure in a direction normal to the surface of the wick, and means under the wick structure for collecting any excess fuel that drips from the wick structure.

3. A fuel vaporizer for supplying fuel vapor to a stream of air comprising a casing having an air outlet passage and having an air inlet opening, a capillary air pervious wick structure disposed between the inlet and the outlet passage in such manner that air flowing through the device must pass through portions of the wick structure in a direction normal to its surface, and means for circulating fuel through the wick structure comprising a perforate tube, the wick being tightly wrapped about the tube in such manner as to close it from the free escape of fuel therefrom.

4. A carbureting attachment for internal combustion engines comprising a housing having an air outlet connection and having air inlet openings, a capillary wick structure disposed between the air outlet and the inlet openings in such manner that substantially all of the air passing through the device is brought into intimate contact with the wick structure, said wick structure comprising a perforate coil having inlet and outlet connections with absorbent material wrapped thereabout and having closely separated strands of absorbent material stretched from one portion thereof to another.

5. A vaporizing device of the class described comprising a housing of generally cylindrical form having inlet windows in the side wall thereof, a generally cylindrical wick structure inside the housing, means for both supplying fuel to be vaporized to the wick structure and supporting the wick structure, said wick structure being so disposed in the housing that air entering the windows has to pass through the wick structure, means at one end of the housing providing an air inlet connection, and means forming a fire screen extending between and confined against opposite ends of the housing and through which air may flow.

6. A fuel vaporizing device of the class described comprising a housing having opposed end members and a side wall structure between the end members, the side wall structure having air intake windows therein, one of the end wall members having an air outlet connection formed therein, the lower one of said end members having an annular trough therein, a generally cylindrical wick structure arranged vertically inside the housing above the trough, and a fire screen between the end members extending around the interior of the housing inside the wick structure in such manner as to form a central open chamber, means above the trough for supplying fuel to the wick structure, and a drain pipe connection attached to the bottom end chamber and providing a drain pipe for said annular trough.

7. A wick structure for fuel vaporizers comprising a tube perforated at intervals and bent around to form a frame structure, capillary wicking material tightly enclosing the tubing, and strands of wick forming material extending from one portion of the frame to another.

8. A vaporizing unit for attachment to the air intake of a carburetor comprising a housing having a bottom chamber, a side wall member, and a removable cover member, two spaced concentric elements within the housing the inner of which constitutes a fire screen and the outer of which constitutes an air filter, and a vaporizing wick structure between said two members comprising a coiled perforate tube with a wick material wrapped thereabout and extending from one convolution of the coil to another, the side wall of the casing having air inlet openings therethrough.

9. A fuel vaporizing structure for attachment to the air intake of a carburetor comprising a casing having a bottom portion with a central outlet passage therethrough and with a fitting for attaching it to the carburetor air intake pipe, means forming a side wall structure on the bottom member, a removable cover member at the top of the housing, a pair of spaced concentric screens removably positioned in the housing, the inner one constituting a fire screen and the outer one constituting an air filter, the housing having openings through the side wall thereof to permit air to flow therethrough, a wick structure of generally cylindrical form in the space between said concentric screens, and means for continuously supplying liquid fuel to the wick structure.

10. A fuel vaporizer for supplying fuel vapor to a stream of air comprising a casing having an air outlet passage and having an air inlet opening, a wick structure disposed between the inlet and the outlet passage in such manner that air flowing through the device must pass through portions of the wick structure, means for circulating fuel through the wick structure, said wick structure including a perforate coil with wick material wrapped thereover and having spaced strands of wick material extending from one portion thereof to another, there being a chamber inside the wick structure over the outlet passage and a back-fire screen between the chamber and the wick, the casing having a blow-out port therein leading from said chamber to atmosphere, and an outwardly opening door biased to yieldably remain closed over the port.

11. An auxiliary fuel vaporizer for internal combustion engines comprising a perforate duct having fuel inlet and exhaust connections, a capillary air-pervious curtain supported by the duct, and a housing enclosing the duct and curtain having air inlet and outlet openings so disposed that air flowing through the housing must pass through the curtain.

12. An auxiliary fuel vaporizer for internal combustion engines comprising a perforate duct having fuel inlet and exhaust connections, a capillary air-pervious curtain supported by the duct, a housing enclosing the duct and curtain having air inlet and outlet openings so disposed that air flowing therethrough must pass through the curtain, and means in the housing providing a sump under the curtain to collect and carry away fuel that drips from the curtain.

13. An auxiliary fuel vaporizer for internal combustion engines comprising a perforate duct having fuel inlet and exhaust connections, a capillary air-pervious curtain supported by the duct, a housing enclosing the duct and curtain having air inlet and outlet openings so disposed that air flowing therethrough must pass through the curtain, and means in the housing providing a sump under the curtain to collect and carry away fuel that drips from the curtain, said duct being in the form of a coil having spaced convolutions with wick material wrapped thereabout, the curtain of capillary material being stretched from one convolution to the next.

14. An auxiliary fuel vaporizer for internal combustion engines comprising a housing having air inlet and outlet openings, a capillary curtain structure in the housing between the inlet and outlet openings so disposed that air flowing through the housing must pass through the curtain, and a perforate duct built into the capillary curtain structure having inlet and discharge terminals through which liquid fuel is supplied to the capillary curtain, said curtain structure closing the perforations in the duct against the free flow of liquid therefrom.

15. A fuel vaporizer of the class described comprising a casing having an air inlet and an air outlet port therein, the inlet and outlet ports being in different planes which are at an angle to each other, a capillary curtain in the casing through which air must pass from the inlet to the outlet port, said casing having a blow-out port therein opposite the outlet port and an outwardly opening closure for the blow-out port biased to remain normally closed, and a fire screen between the curtain and the outlet port.

16. A fuel vaporizer of the class described comprising a casing having an air inlet port therein, means opening into said casing providing an air outlet duct, the air inlet port and the air outlet duct being so arranged that the air in flowing from one to the other has to change its direction of flow through an angle of about 90°, a capillary curtain in the casing through which the air must pass in flowing from the inlet port to the outlet duct, means for supplying a vaporizable liquid fuel to said curtain, and an outwardly opening blow-out door in the casing opposite the air outlet duct, said door being biased to remain normally closed but which will open when there is a back-fire through the outlet port, and a fire screen between the curtain and the outlet duct out of the direct path of any flame travel from the outlet duct to the blow-out door.

17. For use in a vaporizing device a coil having an inlet connection at one terminal thereof and an outlet connection at the other terminal thereof, said coil having perforated walls, capillary material wrapped about the coil for absorbing liquid which escapes through said perforations but which restrains the free flow of liquid from the perforations and capillary strands stretched from one portion of the coil to another to provide a curtain-like structure through which a gas may pass to evaporate liquid which flows by capillary action along said strands.

JOSEPH C. LANG.